United States Patent Office 2,990,230
Patented June 27, 1961

2,990,230
PROCESS OF PRINTING TEXTILES AND THE COMPOSITION EMPLOYED THEREIN
Hazel C. Beasley, Jamestown, N.C., assignor to The Dow Corning Corporation, Midland, Mich., a corporation of Michigan
No Drawing. Filed Sept. 3, 1957, Ser. No. 681,438
8 Claims. (Cl. 8—62)

This invention relates to a process for printing textile fabrics with a "printing paste" comprising a water and a water-dispersible thickening agent.

In the printing of textiles with water-soluble dyes, the general commercial method comprises dispersing the dye in a medium comprising water and a thickening agent. This medium is commercially called the "printing paste." Its function is to prevent blurring of the impression and to give sharpness of outline during printing. Generally the method involves applying the printing paste to an intaglio engraved roller. Usually the color material is picked from a color pan by means of a brush and applied to the roll. The color material is deposited in that portion of the design which is below the surface of the roll. Any color material clinging to the surface of the roll is removed by means of a doctor blade. The printing is accomplished by passing the fabric between the engraved roll and a print machine cylinder. This cylinder is usually provided with a resilient covering. After printing the fabric is washed to remove the thickening agent.

At the present time this printing operation suffers from several disadvantages which often occur either alone or in combination during commercial operation. One of these is the migration of the dye on the face of the fabric. This causes an indistinct design and also may cause a color change due to the interaction of two different dyes which are printed adjacent to each other in the design. Another disadvantage is the penetration of the dye through the fabric. This causes a lowering of the "color value" of the dye, that is, it requires more dye to give a certain brightness of color than would be necessary if some of the dye did not migrate to the backside of the fabric. This phenomenon results both in a waste of dye and in a dull color.

A third difficulty is the streaking of the fabric due to the fact that all of the color paste is not removed from the raised portion of the roll by the doctor blade. Consequently, this color material is applied to the fabric at places where it is not desired and does not contribute to the design.

It is the object of this invention to provide a composition and a method suitable for printing fabrics which obviates the above disadvantages without deleteriously affecting the color, wash and crock-fastness of the dye. Another object is to improve the economy of operation of printing textiles. Other objects and advantages will be apparent from the following description.

In accordance with this invention a fabric is printed by applying to the fabric from an engraved roll a composition comprising a paste of water and water-dispersible thickening agent, said paste containing a dye and organosilicon compound of the group consisting of silanes of the formula RSi(OCHR"CH₂NR'₂.HY)₃ and partial hydrolyzates thereof, in amount sufficient to give improved color value to the print. In said organosilicon compound R is an aliphatic monovalent hydrocarbon radical of at least 12 C atoms, R" is hydrogen or a methyl radical, R' is hydrogen, a hydrocarbon radical of less than 11 carbon atoms or a hydroxy alkyl radical of 2 to 3 carbon atoms inclusive, and Y is chlorine or an acyloxy group of less than 4 carbon atoms.

The compositions employed in the method of this invention are prepared by merely mixing the water, water-dispersible thickening agent, dye and organosilicon compound. The mixing can be carried out in any desired manner. The amount of organosilicon compound employed can vary depending upon the type of dye and the type of dispersible thickening agent employed in the paste. Sufficient organosilicon compound should be employed in order to give improved color value to the print. In general, from .01 to 1 percent by weight of organosilicon compound based on the weight of the printing paste is sufficient. However, more or less than this amount can be employed if desired.

The printing pastes of dyes employed in the method of this invention can be any of the standard commercial formulations normally employed in the printing of fabric. Such printing compositions are well known to those versed in the art of printing fabrics.

In general, the suitable thickening agents for the paste are carbohydrate type materials such as starch, sodium alginate, natural gums, such as gum arabic, tapioca, tragacanth, locust bean gum; synthetic materials such as methyl cellulose and sodium carboxymethyl cellulose and mineral thickeners such as bentonite. These thickening agents are uniformly characterized by being either soluble in water or in being swelled by water. A mixture of two or more thickening agents may be employed if desired.

Any dyes suitable for printing fabrics can be employed in the process of this invention.

The organosilicon compounds which are operative in this invention include both silanes of the above formula and partial hydrolyzates of such silanes. The partial hydrolyzates are polymeric materials in which some or all of the silicon atoms are linked through oxygen atoms. Both the silanes and partial hydrolyzates are characterized by being dispersible in water.

The organosilicon compounds employed in this invention are best prepared by the method described in the copending application of Cecil L. Frye, Serial No. 529,068, filed August 17, 1955, now U.S. Patent 2,814,572, the disclosure of which is incorporated herein by reference. Briefly, the method comprises reacting silanes of the formula RSiY₃ in which R and Y are as above defined, with amino alcohols of the formula R'₂NCH₂CHR"OH where R' and R" are as above defined. The partial hydrolyzates may be prepared by partially hydrolyzing the silanes or they may be prepared by reacting the amino alcohols with halo siloxanes such as for example RCl₂SiOSiCl₂R or siloxanes of the formula RSi(OAc).₅O₁.₂₅.

For the purpose of this invention R can be any aliphatic hydrocarbon radical of at least 12 carbon atoms such as dodecyl, dodecenyl, hexadecyl, hexadecenyl, octadecyl, octadecenyl, eicosyl and triacontyl. It should be understood that the silanes and partial hydrolyzates can contain more than one of these hydrocarbon radicals.

The groups R' on the hydrogen can be hydrogen or any monovalent hydrocarbon radical of less than 11 carbon atoms or hydroxyethyl or hydroxypropyl radicals. Thus R' can be, for example, β-hydroxyethyl, 2-hydroxypropyl, methyl, ethyl, octyl, vinyl, tolyl, phenyl, cyclohexyl or benzyl. It is preferable that both of the R' groups on the nitrogen be hydrocarbon radicals of less than 7 carbon atoms. It should be understood that in the preparation of the compounds employed in this invention two or more hydroxy amines may be employed so that there may be two or more different amino groups attached to each silicon atom or to various silicon atoms in the product.

In this invention R" can be either hydrogen or methyl and Y can be chlorine, acetoxy, propionyl or formoyl.

The following examples are illustrative only of this invention and should not be construed by way of limitation thereof. In the specification and claims the following abbreviations are used: Me for methyl and Et for ethyl.

*Example 1*

10 parts by weight of cornstarch were dispersed in 500 parts by weight of water and then heated to give a paste. The paste was cooled and 1 percent by weight based on the weight of the paste of a 20 per cent water solution of the compound $C_{18}H_{37}Si(OCH_2CH_2NMe_2 \cdot HCl)_3$ was added. The mixture was then divided into several portions. To each portion a yellow, green or blue direct dye was added. The colored mixture was then applied to cotton fabric. Blanks were run of identical compositions except that none of the organosilicon compound was added. In each case containing the organosilicon compound there was a greatly improved color value of the dye, a more sharply defined print and greatly reduced penetration of the dye through the fabric.

*Example 2*

A similar composition containing 1 percent by weight of the 20 percent silane solution of Example 1 was employed in commercial operation in a textile mill using standard intaglio printing rolls. The results obtained showed the benefits of better color value, freedom from streaking, improved lubricity with respect to the doctor blade which resulted in better cleaning of the surface of the roll, all without deleterious effect on the wash, color and crock-fastness of the print.

*Example 3*

Results equivalent to those of Example 1 were obtained when the following organosilicon compounds were employed in the process of that example:

$$C_{18}H_{35}Si(OCH_2CH_2NMe_2 \cdot HCl)_3$$
$$C_{12}H_{25}Si(OCH_2CH_2NEt_2 \cdot HCl)_3$$
$$C_{30}H_{61}Si(OCH_2CH_2NMe_2 \cdot HCl)_3$$
$$CH_{18}H_{37}Si(OCH_2CH_2NHEt \cdot RCl)_3$$

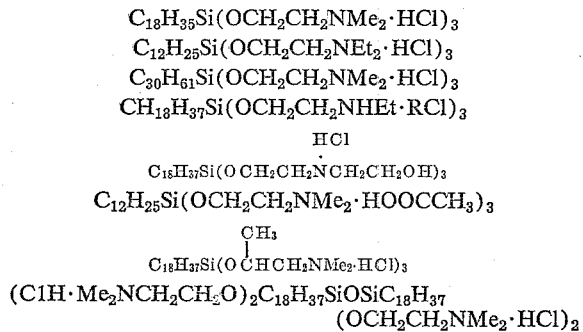

$$(ClH \cdot Me_2NCH_2CH_2O)_2C_{18}H_{37}SiOSiC_{18}H_{37}$$
$$(OCH_2CH_2NMe_2 \cdot HCl)_2$$

That which is claimed is:

1. A process of printing fabric which comprises applying to the fabric from an engraved roll a composition comprising a paste of water and a water-dispersible thickening agent, said paste containing a dye suitable for printing fabrics and an organosilicon compound selected from the group consisting of silanes of the formula $RSi(OCHR''CH_2NR'_2 \cdot HY)_3$ and partial hydrolyzates thereof, in amount sufficient to give improved color value to the print, in said organosilicon compound R being an aliphatic monovalent hydrocarbon radical of at least 12 C atoms, R″ being selected from the group consisting of hydrogen and methyl radicals, R′ being selected from the group consisting of hydrogen, hydroxy alkyl radicals of from 2 to 3 inclusive C atoms and monovalent hydrocarbon radicals of less than 11 C atoms and Y is selected from the group consisting of chlorine and acyloxy radicals of less than 4 C atoms.

2. A process in accordance with claim 1 wherein the organosilicon compound is a silane of the formula $RSi(OCH_2CH_2NR'_2 \cdot HCl)_3$ in which R is an aliphatic monovalent hydrocarbon radical of at least 12 C atoms and in which R′ is a monovalent hydrocarbon radical of less than 7 C atoms.

3. The process in accordance with claim 1 in which the organosilicon compound is a partial hydrolyzate of a silane of the formula $RSi(OCH_2CH_2NR'_2 \cdot HCl)_3$ in which R is an aliphatic monovalent hydrocarbon radical of at least 12 C atoms and R′ is a monovalent hydrocarbon radical of less than 7 C atoms.

4. The process of claim 1 wherein the organosilicon compound is of the formula $$C_{18}H_{37}Si(OCH_2CH_2NMe_2 \cdot HCl)_3$$

5. A composition of matter comprising a paste of water and a water-dispersible thickening agent containing a dye suitable for printing fabrics and an organosilicon compound selected from the group consisting of silanes of the formula $RSi(OCHR''CH_2NR'_2 \cdot HY)_3$ in amounts sufficient to give improved color value of the dye when placed on a fabric, in which organosilicon compound R is an aliphatic monovalent hydrocarbon radical of at least 12 C atoms, R″ is of the group consisting of hydrogen and methyl radicals, R′ is of the group consisting of hydrogen, hydroxy alkyl radicals of 1 to 3 C atoms and hydrocarbon radicals of less than 11 C atoms and Y is of the group consisting of chlorine and acyloxy radicals of less than 4 C atoms.

6. A composition in accordance with claim 5 in which the organosilicon compound is a silane of the formula $RSi(OCH_2CH_2NR'_2 \cdot HCl)_3$ in which R is an aliphatic monovalent hydrocarbon radical of at least 12 C atoms and R′ is a monovalent hydrocarbon radical of less than 7 C atoms.

7. A composition in accordance with claim 5 in which the organosilicon compound is a partial hydrolyzate of a silane of the formula $RSi(OCH_2CH_2NR'_2 \cdot HCl)_3$ in which R is an aliphatic monovalent hydrocarbon radical of at least 12 C atoms and R′ is a monovalent hydrocarbon radical of less than 7 C atoms.

8. A composition in accordance with claim 5 in which the organosilicon compound is $$C_{18}H_{37}Si(OCH_2CH_2NMe_2 \cdot HCl)_3$$

References Cited in the file of this patent
UNITED STATES PATENTS

| | | |
|---|---|---|
| 2,386,259 | Norton | Oct. 9, 1945 |
| 2,436,304 | Johannson | Feb. 17, 1948 |
| 2,637,623 | Janes | May 5, 1953 |
| 2,814,572 | Frye | Nov. 26, 1957 |

FOREIGN PATENTS

| | | |
|---|---|---|
| 454,458 | Canada | Jan. 11, 1949 |

OTHER REFERENCES

McGregor: "Silicones and Their Uses," McGraw-Hill, 1954, p. 213.

UNITED STATES PATENT OFFICE

CERTIFICATE OF CORRECTION

Patent No. 2,990,230                                  June 27, 1961

Hazel C. Beasley

It is hereby certified that error appears in the above numbered patent requiring correction and that the said Letters Patent should read as corrected below.

Column 3, line 39, for "$CH_{18}H_{37}Si(OCH_2CH_2NHEt \cdot RCl)_3$" read -- $C_{18}H_{37}Si(OCH_2CH_2NHEt \cdot HCl)_3$ --.

Signed and sealed this 23rd day of January 1962.

(SEAL)
Attest:

ERNEST W. SWIDER                                         DAVID L. LADD
Attesting Officer                                         Commissioner of Patents